United States Patent
Berger et al.

(10) Patent No.: US 7,527,672 B2
(45) Date of Patent: May 5, 2009

(54) MOISTURE EXCHANGE MODULE HAVING A BUNDLE OF MOISTURE-PERMEABLE HOLLOW FIBRE MEMBRANES

(75) Inventors: Gerhard Berger, Ebersbach (DE); Gert Hinsenkamp, Kirchheim (DE); Jens Intorp, Ulm (DE); Patrick Mangold, Ulm (DE); Jochen Schaefer, Ulm (DE); Sven Schnetzler, Marburg (DE); Wolfgang Weger, Hochdorf (DE); Norbert Wiesheu, Guenzburg (DE)

(73) Assignee: Daimler AG, Stuttgart (DE)

( * ) Notice: Subject to any disclaimer, the term of this patent is extended or adjusted under 35 U.S.C. 154(b) by 478 days.

(21) Appl. No.: 11/117,175

(22) Filed: Apr. 28, 2005

(65) Prior Publication Data

US 2005/0241482 A1    Nov. 3, 2005

(30) Foreign Application Priority Data

May 3, 2004    (DE) .................. 10 2004 022 021

(51) Int. Cl.
*B01D 63/02*    (2006.01)
*B01D 53/22*    (2006.01)
(52) U.S. Cl. ................ 96/8; 95/52; 210/321.81
(58) Field of Classification Search ............... 96/4, 96/8, 10; 95/45, 52; 210/321.78–321.81, 210/321.87–321.9, 500.23
See application file for complete search history.

(56) References Cited

U.S. PATENT DOCUMENTS

| | | | | |
|---|---|---|---|---|
| 4,082,670 A * | 4/1978 | Joh | .......... | 210/195.2 |
| 4,124,510 A * | 11/1978 | Joh | .......... | 210/321.8 |
| 4,220,535 A * | 9/1980 | Leonard | .......... | 210/321.89 |
| 4,880,440 A * | 11/1989 | Perrin | .......... | 95/47 |
| 5,066,397 A * | 11/1991 | Muto et al. | .......... | 210/321.61 |
| 5,108,464 A * | 4/1992 | Friesen et al. | .......... | 95/52 |
| 5,160,511 A * | 11/1992 | Lovelock | .......... | 95/52 |
| 5,468,283 A * | 11/1995 | French et al. | .......... | 95/45 |
| 6,653,012 B2 * | 11/2003 | Suzuki et al. | .......... | 429/39 |
| 6,669,177 B2 | 12/2003 | Shimanuki et al. | .......... | 261/96 |
| 6,755,399 B2 * | 6/2004 | Shimanuki et al. | .......... | 261/104 |
| 7,040,606 B2 * | 5/2006 | Okada | .......... | 261/23.1 |
| 7,156,379 B2 * | 1/2007 | Tanihara et al. | .......... | 261/102 |

FOREIGN PATENT DOCUMENTS

DE    102 14 078    10/2002

(Continued)

*Primary Examiner*—Duane Smith
*Assistant Examiner*—Robert A Clemente
(74) *Attorney, Agent, or Firm*—Davidson, Davidson & Kappel

(57) ABSTRACT

A moisture exchange module includes a bundle of moisture-permeable hollow fiber membranes through which a first gas stream can flow. The bundle of hollow fiber membranes is arranged in a housing, the housing being provided with line elements for supplying and discharging a second gas stream, which flows around the hollow fiber membranes. Between the bundle of hollow fiber membranes and the housing there is at least one flow space, which extends over at least approximately the entire length of that region of the bundle of hollow fiber membranes through which the first gas stream can flow. The at least one flow space surrounds only a small part of the circumference of the bundle of hollow fiber membranes, so that ultimately a moisture exchange operated in cross-current mode is formed. This can preferably be used for the humidification of feed air for fuel cell systems.

7 Claims, 3 Drawing Sheets

FOREIGN PATENT DOCUMENTS

| | | |
|---|---|---|
| DE | 102 44 707 | 4/2004 |
| EP | 0 923 982 | 6/1999 |
| EP | 1 338 852 | 8/2003 |
| JP | 02-059016 | 2/1990 |
| JP | 2001-202976 | 7/2001 |
| JP | 2002-289229 | 10/2002 |
| JP | 2002-292253 | 10/2002 |

* cited by examiner

MOISTURE EXCHANGE MODULE HAVING A BUNDLE OF MOISTURE-PERMEABLE HOLLOW FIBRE MEMBRANES

Priority is claimed to German Patent Application No. DE 10 2004 022 021.2, filed on May 3, 2004, the entire disclosure of which is incorporated by reference herein.

The present invention relates to a moisture exchange module having a bundle of moisture-permeable hollow fiber membranes through which a first gas stream can flow. Furthermore, the present invention relates to the use of a moisture exchange module of this type.

BACKGROUND

Moisture exchange modules of the generic type are described in the prior art. For example, EP 1 338 852 shows a moisture exchange module of this type having a bundle of hollow fiber membranes, which have flowing around them a flow that is guided in countercurrent to the flow within the hollow fiber membranes.

Furthermore, DE 102 14 078 shows, in connection with the prior art, a moisture exchange module in which a moist gas stream is fed to the bundle of hollow fiber membranes centrally via a line provided with openings, with this moist gas stream, after it has flowed around the hollow fiber membranes, being collected in a collection space arranged around the bundle and discharged.

In both cases, the flow through parts of the bundle is poor, i.e. reached by only a small part of the volume of the gas stream, or even nonexistent. This will make the moisture exchange worse, and consequently relatively large modules are required to exchange a predetermined quantity of moisture between two gas streams. In particular, in the moisture exchange module described in DE 102 14 078, the cross section of the region of the hollow fiber membranes around which medium flows increases continuously in the direction of flow, so that fewer hollow fiber membranes are actively utilized in the region of the larger diameter at the bundle of hollow fiber membranes than in the interior of the bundle. This makes the moisture exchange module unnecessarily large for a predetermined exchange capacity.

SUMMARY OF THE INVENTION

It is an object of the present invention to provide a moisture exchange module which allows very efficient exchange of moisture between two gas streams and which can be made as compact as possible.

The present invention provides a moisture exchange module having a bundle of moisture-permeable hollow fiber membranes through which a first gas stream flows, the bundle of hollow fiber membranes being arranged in a housing, the housing being provided with line elements for supplying and discharging a second gas stream, which flows around the hollow fiber membranes, and at least one flow space, which extends over at least approximately the entire length of that region of the bundle of hollow fiber membranes through which the first gas stream can flow, being provided between the bundle of hollow fiber membranes and the housing.

In the present context, length of the bundle of hollow fiber membranes through which the first gas stream can flow is to be understood as meaning its length with the exception of its ends which are stocked up for the purpose of sealing off the hollow fiber inner flow from the hollow fiber outer flow. On account of the flow space extending over this length, it is possible for the second gas stream to flow around the hollow fiber membranes in each case transversely with respect to their axial extent. The significantly smaller extent of the flow space in relation to the diameter produces a targeted flow onto the hollow fiber membranes out of the flow space or into the latter. This targeted flow allows the gas stream to flow uniformly around all the hollow fiber membranes, so that they are efficiently utilized. Consequently, a moisture exchange module of this type can be smaller and more compact.

The moisture can be transferred particularly efficiently from one gas stream to the other as a result of the flow around the hollow fiber membranes transversely with respect to the axial direction of the individual hollow fiber membranes, since this flow around the hollow fiber membranes is produced by means of a large volumetric flow which impinges on the surface of the hollow fiber membranes.

The moisture exchange module according to the present invention therefore allows the exchange of moisture to take place very efficiently and with a high exchange rate per unit volume of the bundle of hollow fiber membranes. This allows a very compact moisture exchange module to be realized.

The moisture exchange module according to the present invention may be particularly suitable for use in a fuel cell system In this case, the moisture exchange module can be used in particular to dry and humidify process gas streams, for example to humidify the feed air for the fuel cell system by means of the exhaust gas from the fuel cell. A compact and lightweight design combined, at the same time, with a very high moisture exchange rate is of crucial importance, depending on the structure and use of a fuel cell system of this type, for example as a drive system in vehicles. The moisture exchange module according to the present invention satisfies these requirements and therefore represents a very good moisture exchange module for the above use.

BRIEF DESCRIPTION OF THE DRAWINGS

Further advantageous configurations of the moisture exchange module according to the present invention will emerge from the claims and from the exemplary embodiments, which are explained in more detail below with reference to the drawing, in which:

DETAILED DESCRIPTION

Figure 1:
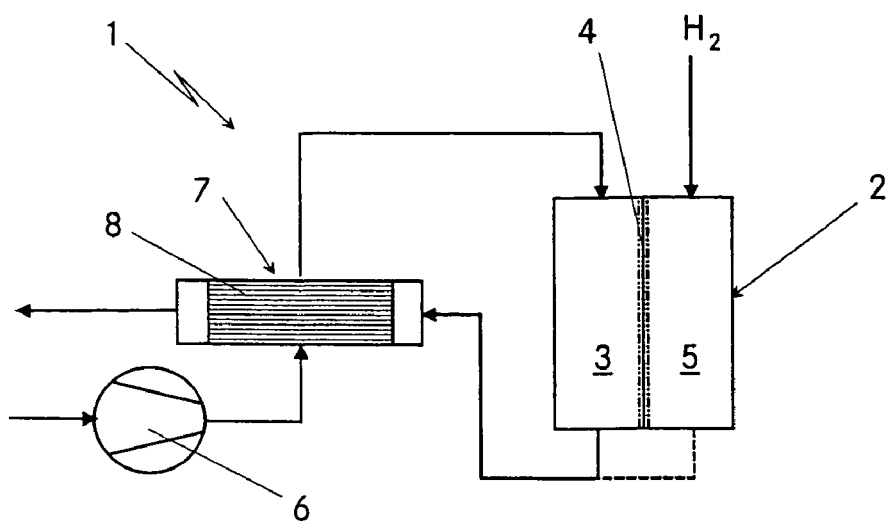
FIG. 1 shows a diagrammatically indicated fuel cell system having a moisture exchange module according to the present invention.

FIG. 1 reveals a very diagrammatically indicated fuel cell system 1. The latter comprises a fuel cell 2, in which a cathode space 3 is separated from an anode space 5 by means of a proton-conducting membrane (proton exchange membrane, PEM) 4. The fuel cell 2 can generate electrical power from hydrogen ($H_2$) in its anode space 5 and air in its cathode space 3, in a manner which is known per se. The fuel cell 2 may be in the form of an individual fuel cell, but is in particular in the form of an array of a large number of fuel cells, i.e. what is known as a fuel cell stack. To prevent the proton-conducting membrane 4 from drying out and being damaged as a result, the air which is fed to the cathode space 3 via a compressor 6 is humidified by the exhaust gases flowing out of the fuel cell 2, in a diagrammatically indicated moisture exchange module 7.

In the exemplary embodiment of the moisture exchange module 7 illustrated here, the moist exchange gas from the fuel cell 2 flows through a bundle 8 of hollow fiber membranes, the outer surfaces of which have the air that is to be humidified for the fuel cell 2 flowing around them. The moisture which is present in the exhaust gas is transferred to the air flowing to the cathode space 3 by the hollow fiber membranes, which are permeable to water vapor, so that the air flowing to the cathode space 3 is humidified and in turn moistens the proton-conducting membrane 4, so that the latter is prevented from drying out and therefrom from damage and/or premature ageing.

Since the pressure loss is higher within the hollow fiber membranes themselves than during flow around them, the arrangement of the compressor 6 illustrated here is particularly efficient, since it allows a higher internal pressure to be produced in the fuel cell 2 for the same compressor power. Therefore, for a predetermined internal pressure, on the one hand, the size and power of the compressor 6 and its energy consumption can be minimized, or on the other hand for a predetermined size and power of the compressor 6 the efficiency of the fuel cell 2 can be increased accordingly on account of the improved thermodynamics at higher internal pressure.

Depending on the fuel cell system 1 used, the anode space 5 of the fuel cell 2 is supplied with hydrogen from a hydrogen store or with hydrogen which has been generated for example from a liquid hydrocarbon by a gas generation system. In the case of a pure hydrogen system, the anode space 5 is operated in dead-end mode or with an anode loop, whereas in the case of hydrogen generated in the gas generation system residual gases from the anode space 5 are discharged as exhaust gas. Accordingly, the moist exhaust gas used for humidification can originate either from the cathode space 3 alone or from the cathode space 3 and the anode space 5 together, as indicated in FIG. 1 by the connection in dashed lines linking the anode space 5 and the exhaust gas from the cathode space 3.

If the fuel cell system 1 used requires, the humidified feed air may also, at least in part, be used in other ways, for example to provide at least some of the quantity of water required to generate a hydrogen-containing gas from, for example, a liquid hydrocarbon, as is carried out, for example, in DE 103 09 794.

The following statements each relate to this exemplary embodiment, presented above, of the moisture exchange module 7 in the fuel cell system 1. However, the present invention should not be restricted to applications of the moisture exchange module 7 according to the invention of this nature.

Figure 2:
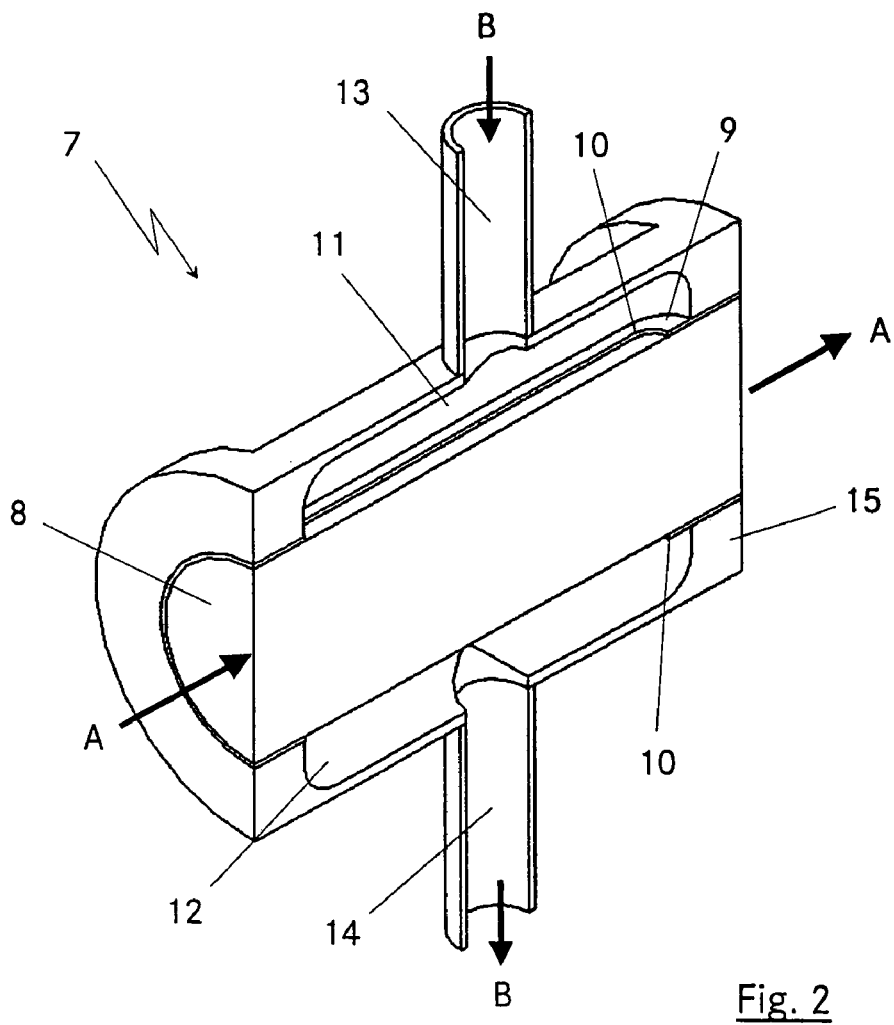
FIG. 2 shows a longitudinal section through a first embodiment of a moisture exchange module.

FIG. 2 illustrates a longitudinal section through an embodiment of a moisture exchange module 7. The bundle 8 of hollow fiber membranes 8 is only indicated by way of example in this figure. A first—for example, moist—gas stream A whose flows through the hollow fiber membranes. The bundle 8 of hollow fiber membranes may furthermore be surrounded by a sleeve 9. The sleeve 9 in this case has suitable openings 10 for a second gas stream B, which flows around the hollow fiber membranes, to flow in and out. The sleeve in this case makes it possible to improve the handling properties of the bundle 8 of hollow fiber membranes, for example during its production or when it needs to be exchanged.

In the exemplary embodiment illustrated here, the moisture exchange module 7 has a flow space 11 and a flow space 12. The two flow spaces 11, 12 are in each case connected to line elements 13, 14, through which the second gas stream B is fed to the flow space 11 and discharged from the flow space 12. The two flow spaces 11, 12 in this case surround only part of the circumference of the bundle 8 of hollow fiber membranes or of the moisture exchange module 7. This can also be seen in particular in the cross section through the moisture exchange module 7 presented in FIG. 3.

Figure 3:
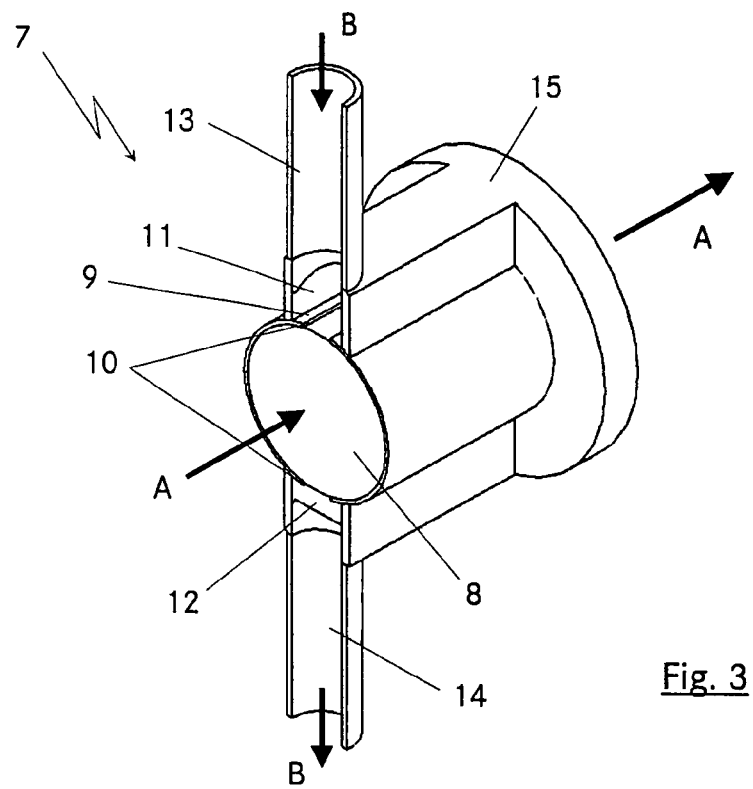
FIG. 3 shows a cross section through the moisture exchange module shown in FIG. 2.

In the configuration of the moisture exchange module 7 shown in FIGS. 2 and 3, the two flow spaces 11, 12 are positioned opposite one another with respect to the bundle 8 of hollow fiber membranes or with respect to a housing 15 of the moisture exchange module 7. This allows flow through the moisture exchange module 7 in cross-current, as it were, to be achieved.

To distribute the volume of the gas flow of the second gas stream B as uniformly as possible over the available cross section of the flow space 11, the line element 13 which supplies the second gas stream B is arranged centrally with respect to the length of the bundle 8 of hollow fiber membranes, as can be seen in the figures. Furthermore, diverter means 16, which prevent the gas stream B from flowing directly and immediately into the bundle 8 of hollow fiber membranes, may be provided between the line element 13 for supplying the gas stream B and that surface of the bundle 8 of hollow fiber membranes which is in contact with the flow space 11. The diverter means 16, which may be designed as a disk or as a flow-enhancing body, for example in a droplet or cone shape, in the shape of an airfoil, etc., therefore produce a uniform distribution of the gas stream B within the flow space 11. This improves the flow onto the hollow fiber membranes of the bundle 8 and the utilization of their surface area.

Figures 4, 5:
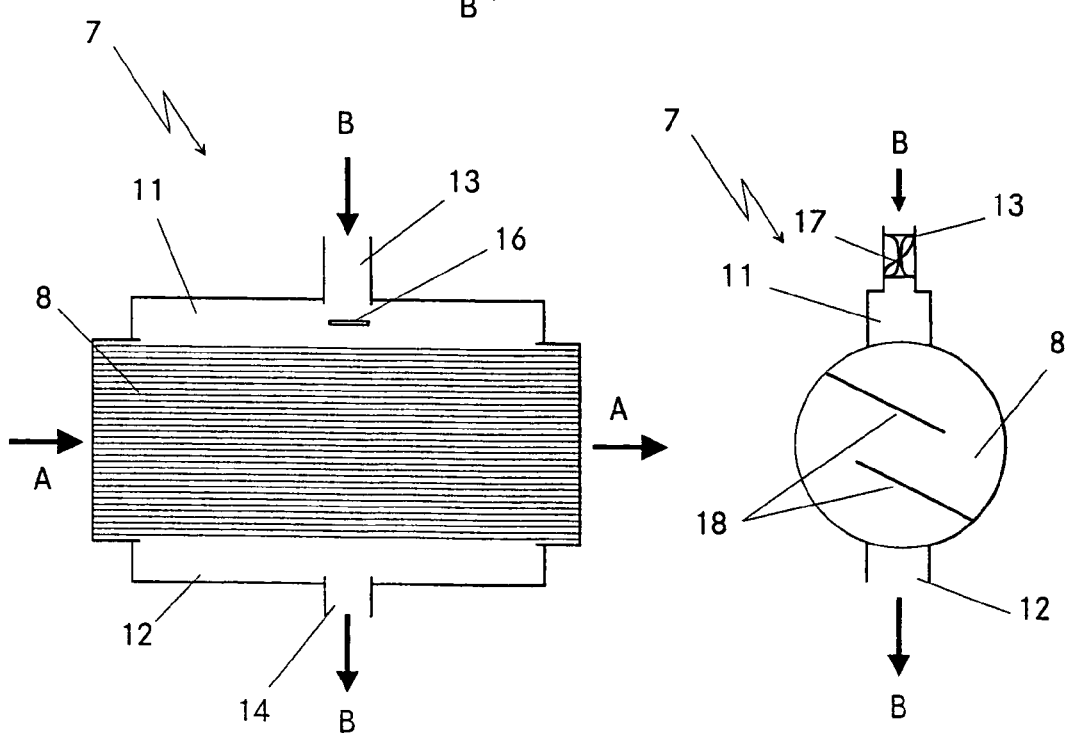
FIG. 4 shows a longitudinal section through a second embodiment of a moisture exchange module.
FIG. 5 shows a cross section through a third embodiment of a moisture exchange module.

A further device for improving the distribution of the gas stream B in the flow space 11, which can be used as an alternative or in parallel, is illustrated in FIG. 5. This device is a means 17 for generating a swirling motion in the gas stream B flowing through the line element 13. The swirling motion produced in this way in the gas stream B produces a very good distribution thereof within the flow space 11, despite its short length in the direction of flow and its large extent in a direction transversely with respect thereto.

The means 17 for generating a swirling motion in the gas stream B, which is only indicated by way of example in FIG. 5, may, for example, comprise a twisted strip of a sheet-like material, so as to form a helical/screw-like element. The strip may, for example, be produced from a sheet of corrosion-resistant metal or the like. Analogously, it would also be conceivable to use a twisted element which is star-shaped in cross section with at least three rays. To produce a sufficient swirling motion in the gas stream B combined with an acceptable flow resistance therein, the element or strip may be twisted through approx. 70° to 270°, in particular through half a revolution (180°). This imparts a sufficient swirling motion to the gas stream B flowing in, combined with an acceptable level of outlay in terms of the flow resistance generated by the means 17, for the gas stream B to be distributed uniformly within the flow space 11.

As can also be seen from FIG. 5, it is possible—likewise as an additional feature or alone—to provide guide elements 18 in the bundle 8 of hollow fiber membranes, which guide elements 18 divide the region through which the second gas stream B can flow into subregions 19, in such a manner that the flow length of the second gas stream B in the bundle 8 of hollow fiber membranes is lengthened compared to the embodiment without the guide elements 18. The guide elements 18 can ensure that the gas stream B flows around as many of the hollow fiber membranes of the bundle 8 as possible, which in turn allows the size of the bundle 8 of hollow fiber membranes, and therefore ultimately the size of the moisture exchange module 7, to be minimized.

All these elements for improving the distribution of the gas stream B in the flow space 11 and therefore the flow through the bundle 8 of hollow fiber membranes may in this case be integrated in the moisture exchange module 7 which have already been described and those which are described below either on their own or in any desired combination with one another.

Figure 6:
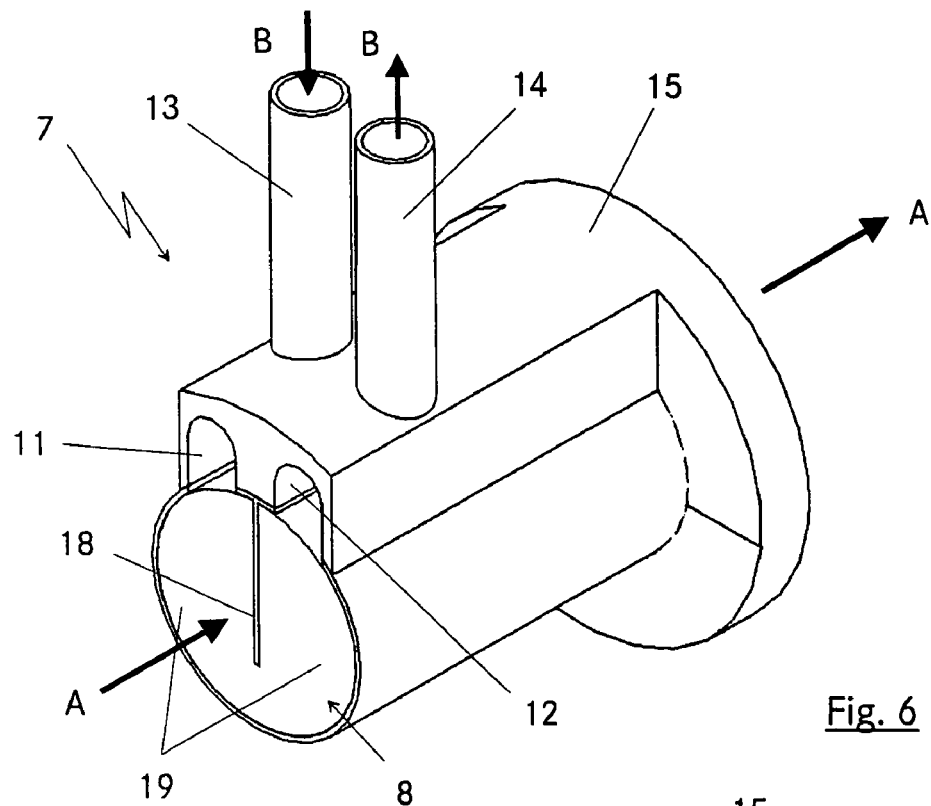
FIG. 6 shows a cross section through a fourth embodiment of a moisture exchange module.

The moisture exchange module 7 shown in FIG. 6 differs from that shown in the previous figures by virtue of the fact that the two flow spaces 11, 12 are arranged substantially on one side of the bundle 8 of hollow fiber membranes or of the housing 15. A guide element 18 which divides the region of the bundle 8 into two subregions 19 and allows communication between the subregions 19 only on their side remote from the flow spaces 11, 12, therefore ultimately allows flow through the moisture exchange module 7 in cross-current. The fact that the flow spaces 11, 12 and the line elements 13, 14 connected to them are arranged on one side allows good accessibility for supplying and discharging the gas stream B and a simplified structure for packaging of an overall system comprising the moisture exchange module 7.

Figure 7:
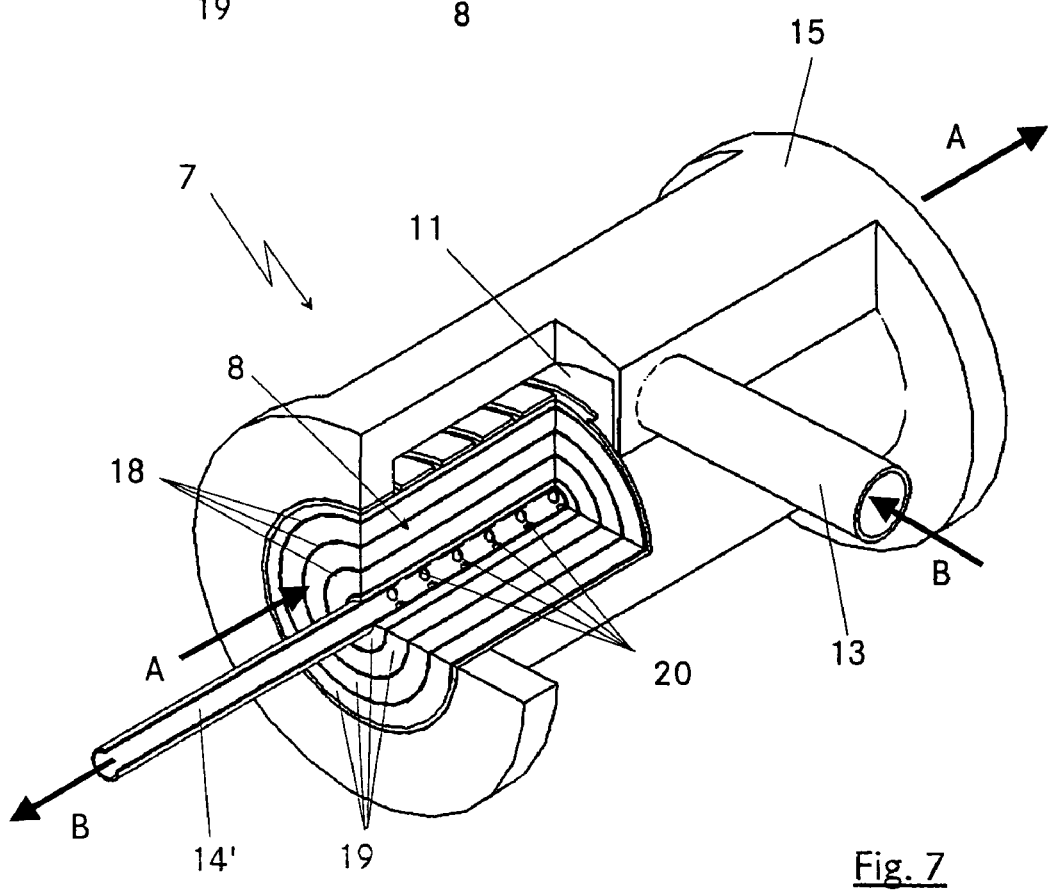
FIG. 7 shows a fifth embodiment of a moisture exchange module, partially in section.

A further alternative form of the moisture exchange module 7 is illustrated in FIG. 7. In this case, it is possible for the direction of flow described below to be reversed at any time.

In the exemplary embodiment shown in FIG. 7, the gas stream B flows through the line element 13 into the flow space 11, with the feed line for the gas stream B being formed substantially tangentially with respect to the bundle 8 of hollow fiber membranes. Guide elements 18, which, like all the guide elements. 18 illustrated and explained here, extend areally in the direction of the hollow fiber membranes, then guide the gas stream, as it flows around the hollow fiber membranes in the bundle 8, to a line element 14' provided with openings 20, in which the humidified gas stream B then collects and by means of which it is then discharged from the moisture exchange module 7. If just the individual hollow fiber membranes are considered, this too represents a moisture exchange module 7 operated in cross-current mode.

In the illustration shown in FIG. 7, the line element 14' is located in the centre of the bundle 8 of hollow fiber membranes. Together with the guide element 18, which is then of helical configuration, the overall result is a good and uniform flow through all the regions of the bundle 8 of the hollow fiber membranes, so that the latter can be optimally utilized with a view to achieving a compact and efficient moisture exchange module 7.

What is claimed is:

1. A moisture exchange module comprising:
a housing;
a bundle of moisture-permeable hollow fibre membranes disposed in the housing;
a first gas stream flowing through a first region of the bundle of hollow fibre membranes;
wherein the housing includes a plurality of line elements and at least one flow space disposed between the bundle of hollow fibre membranes and the housing and extending substantially an entire length of the region, and wherein the plurality of line elements are configured to supply and discharge a second gas stream, the second gas stream flowing around the hollow fibre membranes; and
a swirling device configured to impart a swirling motion to the gas stream before it flows into the at least one flow space disposed in a first line element of the plurality of line elements for supplying the second gas stream.

2. A moisture exchange module comprising:
a housing;
a bundle of moisture-permeable hollow fibre membranes disposed in the housing;
a first gas stream flowing through a first region of the bundle of hollow fibre membranes;
wherein the housing includes a plurality of line elements and at least one flow space disposed between the bundle of hollow fibre membranes and the housing and extending substantially an entire length of the region, and wherein the plurality of line elements are configured to supply and discharge a second gas stream, the second gas stream flowing around the hollow fibre membranes;
wherein the at least one flow space includes a first flow space connected to a first line element of the plurality of line elements configured to supply the second gas stream, and a second flow space connected to a second line element of the plurality of line element configured to discharge the second gas stream;
wherein the first flow space is disposed on one side of the bundle of hollow fibre membranes and the second flow space is disposed on an opposite side of the bundle of hollow fibre membranes; and
a plurality of guide elements disposed in the bundle of hollow fibre membranes and dividing a second region through which the second gas stream can flow into a plurality of subregions so that a flow length of the second gas stream within the bundle of hollow fibre membranes is longer than without the plurality of guide elements.

3. A moisture exchange module comprising:
a housing;
a bundle of moisture-permeable hollow fibre membranes disposed in the housing;
a first gas stream flowing through a first region of the bundle of hollow fibre membranes;
wherein the housing includes a plurality of line elements and at least one flow space disposed between the bundle of hollow fibre membranes and the housing and extending substantially an entire length of the region, and wherein the plurality of line elements are configured to supply and discharge a second gas stream, the second gas stream flowing around the hollow fibre membranes;
wherein the at least one flow space includes a first flow space connected to a first line element of the plurality of line elements configured to supply the second gas stream, and a second flow space connected to a second line element of the plurality of line element configured to discharge the second gas stream;
wherein the first and second flow spaces are disposed on a first circumferential side of the bundle of hollow fibre membranes, and further comprising a guide element dividing the bundle of hollow fibre membranes into two subregions, the two subregions being in communication with one another on a side of the bundle remote from the first side.

4. A moisture exchange module comprising:
a housing;
a bundle of moisture-permeable hollow fibre membranes disposed in the housing;

a first gas stream flowing through a first region of the bundle of hollow fibre membranes;

wherein the housing includes a plurality of line elements and at least one flow space disposed between the bundle of hollow fibre membranes and the housing and extending substantially an entire length of the region and surrounding only part of a circumference of the bundle, and wherein the plurality of line elements are configured to supply and discharge a second gas stream, the second gas stream flowing around the hollow fibre membranes;

wherein the at least one flow space includes only one flow space, wherein a first one of the plurality of line elements supplies or discharges from the flow space, and further comprising a guide element running within the bundle of hollow fibre membranes and guiding a flow of the second gas stream to a second one of the plurality of line elements, the second one of the plurality of line elements having a circumference with a plurality of openings and being arranged in the bundle of hollow fibre membranes.

5. The moisture exchange module as recited in claim 4, wherein the second one of the plurality of line elements opens out into the flow space tangentially with respect to a cross section of the bundle of hollow fibre membranes.

6. The moisture exchange module as recited in claim 4 wherein the guide element is of helical form.

7. The moisture exchange module as recited in claim 4, wherein the second line element is arranged centrally in the bundle of hollow fibre membranes.

* * * * *